United States Patent
Telteu-Nedelcu et al.

(10) Patent No.: US 12,077,283 B2
(45) Date of Patent: Sep. 3, 2024

(54) ELECTRO-MECHANICAL ACTUATOR FOR CONTROLLING THE MOVEMENT OF AN AIRCRAFT

(71) Applicant: SOCIÉTÉ ANONYME BELGE DE CONSTRUCTIONS AÉRONAUTIQUES, S.A.B.C.A., Brussels (BE)

(72) Inventors: Dan Telteu-Nedelcu, Brussels (BE); Albert Britte, Brussels (BE)

(73) Assignee: SOCIETE ANONYME BELGE DE CONSTRUCTIONS AÉRONAUTIQUES, S.A.B.C.A., Brussels (BE)

( * ) Notice: Subject to any disclaimer, the term of this patent is extended or adjusted under 35 U.S.C. 154(b) by 0 days.

(21) Appl. No.: 17/788,282

(22) PCT Filed: Dec. 11, 2020

(86) PCT No.: PCT/EP2020/085751
§ 371 (c)(1),
(2) Date: Jun. 22, 2022

(87) PCT Pub. No.: WO2021/130032
PCT Pub. Date: Jul. 1, 2021

(65) Prior Publication Data
US 2023/0023394 A1    Jan. 26, 2023

(30) Foreign Application Priority Data

Dec. 23, 2019 (EP) .................................. 19219517

(51) Int. Cl.
*B64C 13/50* (2006.01)

(52) U.S. Cl.
CPC ............ *B64C 13/506* (2018.01); *B64C 13/50* (2013.01)

(58) Field of Classification Search
CPC .............................. B64C 13/50; B64C 13/506
See application file for complete search history.

(56) References Cited

U.S. PATENT DOCUMENTS 4,697,672 A * 10/1987 Linton .................... F16H 35/10
                                                              188/134
5,582,390 A * 12/1996 Russ ....................... B64C 13/28
                                                              244/99.2
(Continued)

FOREIGN PATENT DOCUMENTS

| EP | 3533707 | 9/2019 | |
|----|---------|--------|---|
| WO | 2017207917 | 12/2017 | |
| WO | WO-2017207917 A1 * | 12/2017 | ........... F16D 13/752 |

OTHER PUBLICATIONS

International Search Report, issued in PCT/EP2020/085751, dated Jan. 15, 2021.
(Continued)

*Primary Examiner* — Richard G Davis
(74) *Attorney, Agent, or Firm* — Ferguson Case Orr Paterson (57) ABSTRACT

Actuator for moving an aircraft control part, the actuator comprising: a mobile element movable in a first direction and in a second direction; an actuating means for moving the mobile element (2); a mechanical brake which, in case of loss of electrical power and/or in case of a brake signal, brakes the mobile element in the first direction until a force from the aircraft control part on the mobile element (2) exceeds a threshold force.

19 Claims, 3 Drawing Sheets

(56) References Cited

U.S. PATENT DOCUMENTS 5,918,836 A * 7/1999 Russ ................. B64C 13/34
                                                                        74/89.23
2022/0057826 A1* 2/2022 Lawniczak ............ G05G 5/03

OTHER PUBLICATIONS

Written Opinion, issued in PCT/EP2020/085751, dated Jan. 15, 2020.

* cited by examiner

ELECTRO-MECHANICAL ACTUATOR FOR CONTROLLING THE MOVEMENT OF AN AIRCRAFT

TECHNICAL FIELD

The present invention relates to an actuator for moving an aircraft control part, in particular for a flap, spoiler or aileron of an airplane.

BACKGROUND ART

Traditionally, actuators for those aircraft control parts were mechanically or hydrostatically connected to a controller in the cockpit, e.g. by a mechanical cable, or hydrostatical cable with a control liquid. Modern airplanes control the aircraft control parts electrically which is also called fly-by-wire. This is much easier in the maintenance and reduces the weight of the airplane. The most common solution uses electro-hydrostatic actuators which transform the electrical signal from the cockpit into a hydrostatic force in a cylinder close to the aircraft control part. The hydrostatic system can be easily designed such to fulfil certain safety requirements for the aircraft control part. One safety requirement is for example that in case of a power loss, the aircraft control part can retract back in its retracted position, when the force on the aircraft control part pushes it in a second direction back into the retracted position, and stays in its position, when the force on the aircraft control part pushes in an opposite first direction to avoid a free uncontrolled movement of the flight control surface. This can be achieved easily with corresponding control valves. The further advantage of the hydrostatic solution is that due to the overpressure valves which avoid a damage on the system, the movement of the aircraft control part in the first direction is allowed, when a certain force or pressure is exceeded. This avoids serious damages on the structural parts of the aircraft or the wing of the airplane if the force on the aircraft control part in the first direction increases over the mechanical strength of the system. However, the disadvantage of this system is that electro-hydrostatical actuator necessitates a hydrostatic pump, hydrostatic cylinders, hydrostatic liquid and hydrostatic conductors. This requires space and weight which is valuable in an aircraft. This equipment is also expensive and costly in terms of implementation and maintenance.

Therefore, there are new solutions which use a pure electro-mechanical actuator in combination with a brake. This is much lighter and requires less space. One solution foresees that the brake in its unpowered state brakes the actuator and holds it in its position. When the actuator is moved to another position, the brake is released by an electrical actuator so that the electro-mechanical actuator can change its position. In case of loss of power, the brake keeps the electro-mechanical actuator and thus the aircraft control part in its last position. This has the advantage that the power consumption for holding a given actuator position is zero, as the force of fixing comes from the unpowered brake. Another solution consists in permanently controlling the electrical actuator and release the brake in case of loss of power. Whatever solution, the drawback is that upon power loss, the aircraft control part cannot move in its aerodynamic equilibrium position. This impossibility might have safety consequences.

EP3533707 and EP3099572 disclose therefore mechanical brakes which fully block the electric actuator in case of power loss only in one direction, but not in the second direction. This solution is very elegant. Nevertheless, it does not provide the same security as electro-hydrostatic actuators which, due to the intrinsic properties of the hydrostatic system in case of power loss, allow the aircraft control part to move also in the first direction, when the force in the first direction exceeds a certain threshold.

On rocket engines, actuators are also used to orient the engine and its nozzle (usually the whole engine, on which the nozzle is rigidly fixed, is mounted on a gimbal and is oriented by the actuators). In case of loss of power, the actuator(s) must be blocked in both directions. During engine ignition, excessive side-loads can be generated by transient flows in the engine nozzle. As described above, hydrostatic solutions allow to include with overpressure valves security features against a damage of the system for forces exceeding the forces of the system. Electromechanical actuators, as described above do not provide system protection against high forces to avoid damage to the surrounding elements like structures or engines without huge oversizing that exclude them from such applications.

BRIEF SUMMARY OF THE INVENTION

It is the object to provide an actuator which is light, small, easy to control and safe.

It is the object to overcome the disadvantages of the state of the art.

The object is solved by the actuator, the control system, and the aircraft according to the independent claim(s).

By adapting the brake so that the brake releases the movement in the first direction again after a certain threshold force on the mobile element is exceeded allows to get the same safety behaviour as achieved in hydrostatic actuators. Thus, all the advantages of electro-mechanic actuators with brakes and of electro-hydrostatic actuators can be combined. A light and small electro-mechanic actuator with security characteristics similar to those of hydrostatic actuators is achieved.

The object is further solved by an actuator for moving an aircraft control part controlling the movement of an aircraft, the actuator comprising: a mobile element movable in a first direction and in a second direction; an actuating means for moving the mobile element; a mechanical brake comprises a cam with a profiled surface and a braking element pushing, in the case of loss of electrical power, on the profiled surface of the cam, wherein the profiled surface of the cam is designed such that the braking element pushing against the profiled surface allows a movement of the mobile element in the second direction and brakes the mobile element in the first direction, wherein the braking element is configured to roll over the profiled surface of the cam.

This solution drastically reduces the friction of the braking element and makes the brake more reliable under different conditions as the contact between moving parts is a rolling type. This solution is in particular advantageous in combination with the certain threshold described above, because the certain threshold force of the first direction is accurately defined depending on geometry and material stiffness and does not change with temperature, abrasion, etc.

The dependent claims and the following embodiments refer to further advantageous embodiments.

In one embodiment, the mechanical brake comprises a cam with a profiled surface and a braking element pushing, in the case of loss of electrical power, on the profiled surface of the cam, wherein the profiled surface of the cam is designed such that the braking element pushing against the profiled surface allows a movement of the mobile element in the second direction and brakes the mobile element in the first direction until the force from the aircraft control part on the mobile element exceeds the threshold force. The profiled surface of the cam is a simple and reliable solution for realizing the above-described brake behaviour.

In one embodiment, the braking element is configured to roll over the profiled surface of the cam, in particular when the braking element is pushed against the profiled surface of the cam and the mobile element is moving in the first or second direction. This solution reduces the friction of the braking element and makes the brake more reliable under different conditions.

In one embodiment, the mechanical brake, in case of loss of electrical power, allows a movement in the second direction. This allows applications which, in case of loss of power, block the aircraft control part in the first direction until a force exceeds the threshold and to provide a free movement in the second direction to bring the aircraft control part back in its initial position.

In one embodiment, the brake is coupled over a one-way bearing with the mobile element allowing a free movement of the mobile element in the second direction and couples the mobile element with the brake to brake the mobile element in the first direction. Preferably, the cam is coupled over a one-way bearing with the mobile element allowing a free movement of the mobile element in the second direction and couples the mobile element with the cam to brake the mobile element in the first direction.

In one embodiment, the mechanical brake, in case of loss of electrical power, brakes the mobile element in the second direction and allows a movement of the mobile element in the second direction, if a force from the aircraft control part on the mobile element exceeds a second threshold force. This allows applications which, in case of loss of power, block the aircraft control part in both directions until a force exceeds the thresholds.

In one embodiment, the actuating means is an electro-mechanical actuator. The meaning of electro-mechanical actuator shall not include an electrically controlled hydrostatic actuator. Preferably, an electro-mechanical actuator is an actuator converting electrical energy (directly) into a movement (in the first or second direction).

DRAWINGS

One or more non-limitative embodiments of the invention are shown in the following figures.

In the drawings, the same reference numbers have been used for the same or analogue elements.

DETAILED DESCRIPTION OF ONE EMBODIMENT OF THE INVENTION

In the following a non-limitative embodiment of the invention will be described making reference to the drawings.

The invention concerns a brake for an actuator for controlling an aircraft control part (see e.g. in FIG. 1, 2, 3 or 4). The invention concerns further an actuator for controlling an aircraft control part with such a brake (not shown in the figures). The invention concerns further an aircraft control system comprising said actuator and said control part whose position is controlled by the actuator to control the movement of the aircraft (not shown in the figures). The invention concerns further an aircraft with such an aircraft control system (not shown in the figures).

In one embodiment, the aircraft is an airplane. In another embodiment, the aircraft is a spacecraft. The spacecraft can be a rocket, a spaceplane or any other type of launcher. However, the aircraft could also be a helicopter, a rocket or another aircraft.

The aircraft control system is configured to control the movement of the aircraft, in particular during flight, landing, take-off and movement on the ground. The aircraft control system comprises the actuator described further below and the aircraft control part.

The aircraft control part is configured to be movable and to control the movement of the aircraft. The aircraft control part is preferably movable between an initial or retracted position (first position) and an extended position (second position). The aircraft control part can preferably assume or take multiple positions in between the retracted position and the extended position. The multiple positions could be a plurality of defined discrete positions or could be a continuum of positions or a combination of both. The movement of the aircraft control part from the retracted position into the extended position is considered a first control part direction and the movement of the aircraft control part from the extended position into the retracted position is considered a second control part direction. The movement of the aircraft control part can be a rotation, a translation or a combination of both. The movement of the aircraft control part can be a movement with one degree of freedom in which the aircraft control part can (only) be moved in the first control part direction and the second control part direction. The degree of freedom can be a pure translation, a pure rotation or a combination of both leading to a change of position and orientation of the aircraft control part. In another embodiment, the aircraft control part can be moved in more degrees of freedom. Preferably, the movement controlled by the actuator described below causes a movement within one degree of freedom.

Preferably, the aircraft control part is configured to control the flow or stream of air around or through the moving aircraft to control the movement of the aircraft. The moving aircraft is preferably a flying aircraft, a landing aircraft, an aircraft taking off, an aircraft moving on the ground like a rolling aircraft or a swimming aircraft or an aircraft gliding on the ground. However, the aircraft control part could also be different control part which controls the movement of the aircraft, e.g. in a rocket, a rocket engine whose orientation is changed for steering the rocket. The aircraft control part is preferably arranged on a wing of the aircraft or airplane. Examples of an aircraft control part are a flap, a spoiler or an aileron. The described actuator is particular advantageous for a spoiler panel which is driven by only one actuator. For a rocket liquid propellant engine, the described actuator is advantageous during ignition of the engine. Establishment of the full flow in the engine nozzle leads to instabilities which has for consequence the application of potentially high and destructive loads on the actuation system and/or the structure. The described actuator will allow control of the transmission of those loads to the actuation system and to the structure, with a predefined threshold.

The aircraft control system comprises preferably further a control part support for supporting the movement of the aircraft control part. The control part support (maybe together with the actuator) constraints the movement of the aircraft control part to the desired movement. The support is preferably fixed or mounted on the aircraft, preferably the airplane, preferably the wing of the airplane.

The actuator comprises an actuator means and a brake.

The actuator means is configured to move the aircraft control part in the first control part direction and in the second control part direction. The actuator means is preferably an electro-mechanical actuator which transfers electrical energy into a movement. The movement of the actuator means is preferably a translation. However, the movement of the actuator means could be also rotation or a combination of both. The actuator means is controlled by electrical signals and/or is powered by electrical power. Preferably, the actuator means does not involve hydrostatical means or the actuator means does not transform electrical energy into hydrostatical energy and/or does not transform hydrostatical energy into a movement or a mechanical energy. The actuator means comprises preferably an electrical motor. The electrical motor is preferably a rotating electrical motor which transfers electrical energy in a rotation of a motor axis. Preferably, the rotation of the motor axis is transferred into a translational movement, preferably a linear movement. This can be achieved by a spindle motor, preferably by a screw-nut mechanism either ball-screw or roller-screw implementation. Or the actuator means could be any other (electrically powered) actuator means which causes a movement, either a translational or rotational movement (rotary actuator).

The actuator means comprises a mobile element which is movable in a first direction and in a second direction. The second direction being the opposite direction relative to the first direction. The movement of the mobile element in the first direction infers a movement of the aircraft control part in the first control part direction. The movement of the mobile element in the second direction infers a movement of the aircraft control part in the second control part direction. The actuator means could comprise one or more further mobile elements to transfer the movement created by the actuator means to the aircraft control part. In the case of more than one mobile elements, the mobile element can be any of the movement transferring mobile elements. The mobile element could also be any mobile element to which the movement of the mobile element(s) transferring the movement from the actuator means to the aircraft control part is transmitted. But preferably, the mobile element is a mobile element transmitting movement energy from the actuator means to the aircraft control part.

Preferably, the mobile element of the actuator means rotates around a (fixed) mobile element rotation axis. In case of a rotating electrical motor, a spindle motor or a ball screw motor, the mobile element could be the motor axis, the motor spindle or the motor screw or any rotating element to whom the rotation of the motor axis, the motor spindle or the motor screw is transmitted (and whose rotation is transmitted on the motor axis, the motor spindle or the motor screw). Preferably, the actuator means comprises a further mobile element which transfers the rotational movement of the rotating mobile element to a translational movement of the further mobile element (like in the case of a spindle motor or a ball screw motor). In case of the mobile element being a rotating element pivotable or rotatable around the mobile element rotation axis, the first direction is a first rotation direction around the mobile element rotation axis and/or the second direction is a second rotation direction around the mobile element rotation axis and/or the force from the aircraft control part on the mobile element is a torque and/or the threshold force(s) (mentioned later) is/are a threshold torque(s).

However, it is also possible that the mobile element of the actuator means translates (performs a translational movement, preferably a straight translational movement). This could be the case when using a linear motor translating the mobile element. This could be the case, when the translating element transforming the rotational energy of a rotating element into a translational movement is used as mobile element.

FIG. 1 to 5 show four exemplary embodiments of the brake. In the four embodiments, the mobile element 2 of the actuator or the actuating means is a rotating element, e.g. an axle, for example the motor axle, rotating in the first direction 21 and in the second direction 22.

Figure 6:
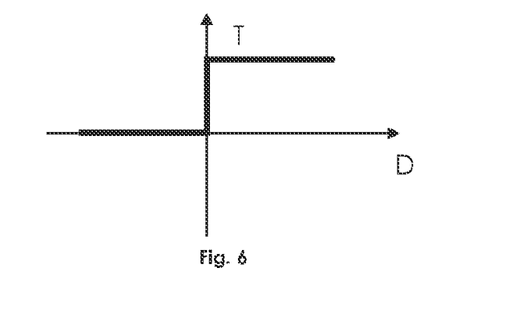
FIG. 6 shows a schematic transfer function of the resistive torque of the first to third embodiment over the movement direction.

The three embodiments of the brake shown in FIG. 1 to 4 have the following behaviour: In case of loss of power, the mechanical brake brakes the mobile element 2 in the first direction 21 and allows a movement of the mobile element 2 in the first direction 21, if a force from the aircraft control part on the mobile element 2 exceeds a threshold force and allows a movement of the mobile element 2 in the second direction 22. Thus, if the force on the aircraft control part pushes the mobile element 2 in the first direction, it is braked as long as the pushing force is smaller than the threshold force and once the pushing force exceeds the threshold force, the brake allows again a movement of the mobile part 2 in the first direction 21. The threshold force is defined such to avoid that the force on the aircraft control part could destroy any part of the aircraft control system. If the force on the control part pushes the mobile element 2 in the second direction, this direction is allowed. FIG. 6 shows schematically the transfer function of the resistive torque T created by the brake over the spin direction D of the mobile part 2. The spin direction D is illustrated on the X-axis, with the first direction 21 represented on the positive X-axis (right part) and with the second direction 22 represented on the negative X-axis (left part). Here mobile part 2 does not move in the first direction 21, if the threshold force is not reached or exceeded, i.e. until a certain resistive torque T of the brake is reached. On the other side, there is no resistive torque by the brake in the second direction 22 so that the mobile part 2 can freely move in the second direction. The resistive torque for a movement in the second direction 22 can also be non-zero so that in the case of loss of power, the aircraft control part is braked a bit while moving into its initial position. However, such a non-zero resistive torque in the second direction 22 is close to zero compared to the resistive torque related to the force threshold in the first direction 21, i.e. the force threshold in the first direction 21 is (much) bigger than the force necessary to move the mobile part 21 in the second direction. The three embodiments are described now in more detail with the help of FIG. 1 to 4.

The brake comprises a cam 1 and a braking element 8 or 8' (for the sake of brevity only 8 is mentioned subsequently).

Figure 1:
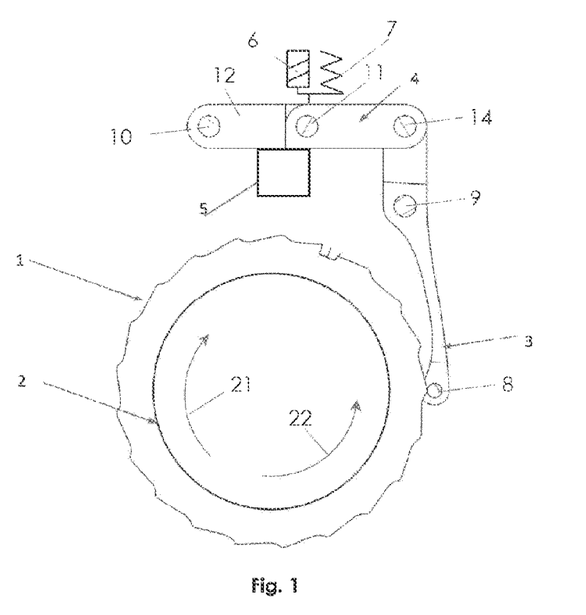
FIG. 1 shows a cross sectional view of a first embodiment of an actuator with the brake in an attached position.
Figure 2:
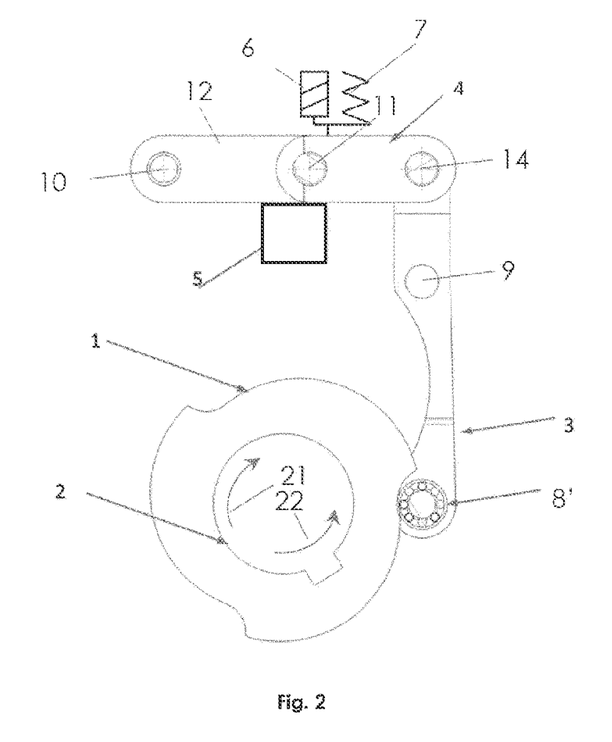
FIG. 2 shows a cross sectional view of a second embodiment of an actuator with the brake in an attached position.

The cam 1 is arranged on a first actuator part and the braking element is arranged on a second actuator part. The first actuator part of the actuator being one of the mobile element 2 and a fixed element 18 of the actuator. The second actuator part is the other one of the mobile element 2 and the fixed element 18. The fixed element 18 is not shown in FIGS. 1 and 2, but only in FIGS. 3 and 4 without any limitation to the invention. Thus, one of the cam 1 and the braking element 8 is arranged on the mobile element 2 and the other one of the cam 1 and the braking element 8 is arranged on a fixed element 18 of the actuator. The fixed element 18 can be any element of the actuator not moving with the mobile element(s) 2 of the actuator means. This can be the housing of the actuator, a support structure of the housing. The fixed element could also be a fixed element 18 of the aircraft control system or of the aircraft. Thus, the cam 1 and the braking element 8 move relative to each other, when the mobile element 2 moves. In the preferred embodiment, the cam 1 is arranged on the mobile element 2 and the braking element 8 is arranged on the fixed element 18 as shown in FIGS. 1 and 2. Thus, the cam 1 moves with the mobile element 2 and the braking element 8 connected to the fixed element 18 moves relative to the cam 1. Preferably, the cam 1 is arranged on the motor axle or on the screw of the screw-nut mechanism. The cam 1 is preferably fixed on the mobile element 2, in particular on the rotating element. However, it is also possible that the cam 1 is integrally formed with the mobile element 2, in particular the rotating element.

The cam 1 comprises a profiled surface. The profiled surface comprises preferably at least one braking position, preferably at least two, preferably a plurality of braking positions. Each braking position has preferably the same profile.

The braking element 8 is pushed against the profiled surface. The braking element 8 is configured to relatively move along the profiled surface of the cam 1, when the mobile element 2 moves. This movement of the braking element 8 along the profiled surface of the cam 1 is considered here as a relative movement and can be caused by the cam 1 moving under the braking element 8 or the braking element 8 moving over the profiled surface of the cam 1. The profiled surface of the cam 1 is designed such that the braking element 8 (pushing against the profiled surface of the cam 1) allows a movement of the mobile element 2 in the second direction 22 and brakes the movement of the mobile element 2 in the first direction 21 until the force (from the aircraft control part) on the mobile element 2 in the first direction 21 exceeds a threshold force, in particular when the braking element 8 is in one of the at least one braking position. The profiled surface of the cam 1 or of the braking position is designed such that the braking element 8 cannot move in a first relative direction until the force on the mobile element 2 in the first direction exceeds the threshold force and/or that the braking element 8 can move in a second relative direction, at least with (much) less resistance than in the first relative direction. The first relative direction between the profiled surface of the cam 1 and the braking element 8 causes a movement of the mobile element 2 in the first direction. The second relative direction between the profiled surface of the cam 1 and the braking element 8 causes a movement of the mobile element 2 in the second direction. The profile in the braking position is such that a first slope of the profiled surface in the first relative direction is steeper than a second slope of the profiled surface in the second relative direction such that the movement in the second relative direction is easier (not braked), while the movement in the first relative direction is braked (until the force exceeds the threshold). The first slope of the profiled surface in the first relative direction infers a first force threshold for the braking element 8 relatively moving in the first relative direction. The second slope of the profiled surface in the second relative direction infers a second force threshold for the braking element 8 relatively moving in the second relative direction. The first force threshold is larger (preferably much larger) than the second force threshold. The term "force threshold" without specifying, if the first or second force threshold is meant, shall in here refer to the first force threshold. The first threshold is preferably chosen such that a force on the aircraft control part in the first control part direction would not damage the system. The first force threshold corresponds thus to the function of the overpressure valve in hydrostatic systems. The second force threshold is chosen such that the aircraft control part is moved with a small resistance back into the retracted position, when a retracting force acts on the aircraft control part in the first control part direction. This avoids that the aircraft control part is pushed by the air stream or other external forces too quickly into the retracted position which could also cause damages.

The or each braking position is preferably a (local) potential minimum so that the braking element 8 not being in a braking position would move in the first relative direction until it reaches the next braking position in the first relative direction, if there is not a force acting in the second direction on the mobile element 2 (exceeding the second threshold force). It would then stop in this next braking position, except the force on the mobile element 2 in the first direction exceeds the (first) force threshold. If on the other side, there is a force on the mobile element 2 in the second direction (exceeding the second force threshold), the braking element 8 would move in the second relative direction until the next braking position (and continue to move in the second relative direction) until the control part has reached its initial or retracted position. In case of a rotating element as a mobile element 2, the cam 2 could be realized as a cam disc or a cam shaft such that the profiled surface of the cam 1 has a closed loop so that the braking element 8 moving in the second (or the first) relative direction could pass two or more times in the same braking point, when the rotating element 2 turns 360° or more. In such a case, it would also be possible to have only one braking point. In case of a translationally moving mobile element 2, the cam could be realised as a cam stick which would correspond to the profiled surface of the cam disk 1 unrolled along a straight line.

The braking element 8 is pushed by a pushing element towards the profiled surface of the cam 1. The pushing element is preferably an elastic element. The force created by the pushing element or the elastic element is preferably perpendicular to the first or second relative direction of the braking element 8 (if the first or second relative direction is a rotational direction, its corresponding tangential direction) in the direction towards the profiled surface of the cam 1. The force created by the pushing element or the elastic element is preferably towards the rotational axis of the mobile element 2 or of the cam 2. The elastic element can be a spring, like a helical spring, a leaf spring or an elastic lever. In the embodiment shown in FIGS. 1 and 2, the elastic element or the spring is an elastic lever 3. The lever 3 is fixed on the second actuator part, preferably the fixed element 18 of the actuator. The braking element 8 is preferably arranged on a first distal end of the lever 3.

The braking element 8 in the example of FIG. 1 is fixed on the lever 3 and/or glides over the profiled surface of the cam 1. This creates friction which could change its characteristics depending on some conditions like temperature or pollution. FIG. 2 shows an improved embodiment, in which the braking element 8' is configured to roll over the profiled surface of the cam 1, when the mobile element 2 is moving. Preferably, braking element 8 rotates around a braking element rotation axis which is preferably parallel to the mobile element rotation axis and/or perpendicular to the first or second relative direction. Preferably, the braking element 8 is a wheel or a ball rotating around said braking element rotation axis. The rotating braking element 8' is preferably rotatably supported by a ball bearing. The rotating braking element 8' is preferably rotatably supported on the lever 3.

Thus, with the present brake all the advantages of a pure electro-mechanical actuator with a brake and security aspects of the electro-hydrostatic actuators are combined.

Preferably, the brake comprises further a controller for switching the brake between an attached state (see FIG. 1 to 3) in which the braking element 8 is pushed against the profiled surface of the cam 1 and a detached state (see FIG. 4) in which the braking element 8 is not pushed against the profiled surface of the cam 1. The controller is preferably configured to detach the brake at least during all movements of the actuator or the aircraft control part. In one embodiment, the controller is configured to keep the brake detached while the actuator is electrically powered. In this case, the position of the aircraft control part is hold by the electrically power of the actuator. If the power of the actuator is lost (or switched off), the controller will automatically attach the brake or switch the brake in the attached state. In another embodiment, the controller is configured to bring the brake (element 8, 8') in the detached state during movements of the actuator or the aircraft control part and to bring the brake (element 8, 8') in the attached state, when the actuator or aircraft control part shall not be moved (even when the actuator has not lost the power). The brake is preferably controlled by a control signal. The control signal controls the brake in the detached state (when the control signal corresponds to a non-brake signal) or the attached state with the described behaviour (when the control signal corresponds to a brake signal). In one embodiment, the described behaviour of the brake or the brake in the attached state is only achieved, when the power for controlling the controller, in particular the electrically powered control element 6 has lost its power. Thus, in this embodiment, the brake signal is never (willingly) applied by the controller. In another embodiment, the described behaviour of the brake or the brake in the attached state is achieved, when the power for controlling the controller, in particular the electrically powered control element 6 has lost its power and/or in case of the brake signal. Thus, in this embodiment, the brake can be brought in the attached state by the controller applying (willingly/actively) the brake signal. This brake signal can be simply to remove the power from the control element 6. Preferably, the brake element 8 does not touch the profiled surface of the cam 1 in the detached state. However, it is also possible that the brake element 8 stays in contact with the profiled surface of the cam 1 in the detached state, but in a loose manner such that the braking element 8 does not fulfil a braking function. This could be achieved by removing the pushing function of the pushing element. All the detailed description of the embodiment above refers to the attached state. The controller comprises preferably a non-electrically powered control element 7 which forces the brake in the attached state and an electrically powered control element 6 which, if activated by electrical power, forces the brake in the detached state (against to the force of the non-electrically powered control element 7). Thus, if the power is lost (or switched off), the non-electrically powered control element 7 will push the actuator in the attached state. In the described embodiment, the switched off power corresponds to the brake signal for attaching the brake element 8, 8' and a control signal providing power to the control element 6 (the non-brake signal) corresponds to the brake in the detached state. The non-electrically powered control element 7 is preferably a control elastic element, preferably a control spring. However, also other non-electrically powered control elements 7 would be possible, e.g. a permanent magnet. The electrically powered control element 6 is preferably an electric actuator, e.g. a piezo-actuator, electro-magnet or a small electro motor. In a preferred embodiment, the controller is designed such that the force on the braking element 8 in the attached state is not transferred on the controller, in particular not on the non-electrically powered control element 7. To move the brake element 8 or the brake lever 3 between the attached and the detached state, the controller comprises preferably a control mechanism controlled by the control elements 6 and 7.

In the control mechanism in FIGS. 1 and 2, the brake lever 3 is preferably supported pivotably around a first pivot point 9 (fixed to the second actuator part). The controller can move/rotate the brake lever 3 between the attached state and the detached state. Preferably, the control mechanism comprises preferably a first control lever 4 and a second control lever 12. (A first end of) The first control lever 4 is pivotably connected to the brake lever 3 at a second pivot point 14. The second pivot point 14 corresponds to a joint which allows the rotation around a second pivot axis (parallel to the rotation axis of the mobile element 2 and/or parallel to the rotation axis of the first pivot point 9). The second pivot point 14 is not fixed and can be moved by the first control lever 4, i.e. the second pivot axis is not fixed, can be translated and/or the second pivot point 14 is preferably a mobile pivot point. This movement allows to switch the brake lever 3 between different rotation states and thus between the attached and detached state. (A first end of) The second control lever 12 is pivotably supported around a third pivot point 10 and (at its second opposed end) pivotably connected to (a second end of) the second control lever 4 at a fourth pivot point 11. The fourth pivot point 11 corresponds to a joint which allows the rotation around a fourth pivot axis (parallel to the rotation axis of the mobile element 2 and/or parallel to the rotation axis of the first pivot point 9 and of the second pivot point 14), i.e. the fourth pivot axis is not fixed, con be translated and/or the second pivot point 14 is preferably a mobile pivot point. The third pivot point 10 corresponds preferably to a joint which allows the rotation around a third pivot axis (parallel to the rotation axis of the mobile element 2 and/or parallel to the rotation axis of the first pivot point 9, the second pivot point 14 and the fourth pivot point 11). The third pivot axis is preferably fixed, i.e. the third pivot point 10 is preferably a fixed pivot point. The fourth pivot point 10 is fixed to the second actuator part. In the attached state, the fourth pivot point 11 is arranged in the first virtual line 16 defined by the third pivot point 10 and the second pivot point 14, and, in the attached state, the first virtual line 16 is perpendicular to a second virtual line defined by the second pivot point 14 and the first pivot point 9. In the detached state, the fourth pivot point 11 is moved out of the first virtual line 16 between the third pivot point 10 and the second pivot point 14. Preferably, the control mechanism comprises further a stopper 5 which stops the control mechanism in the attached state.

Figure 3:
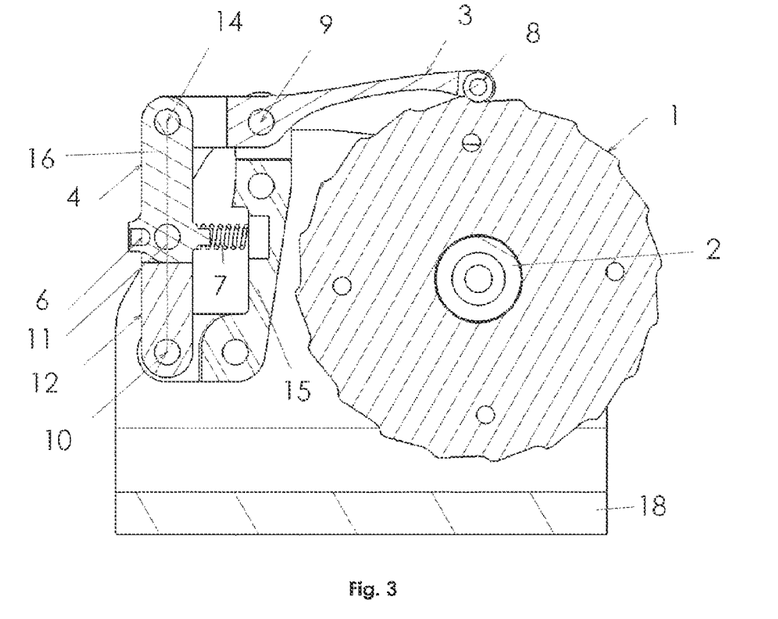
FIG. 3 shows a cross sectional view of a third embodiment of an actuator with the brake in an attached position.
Figure 4:
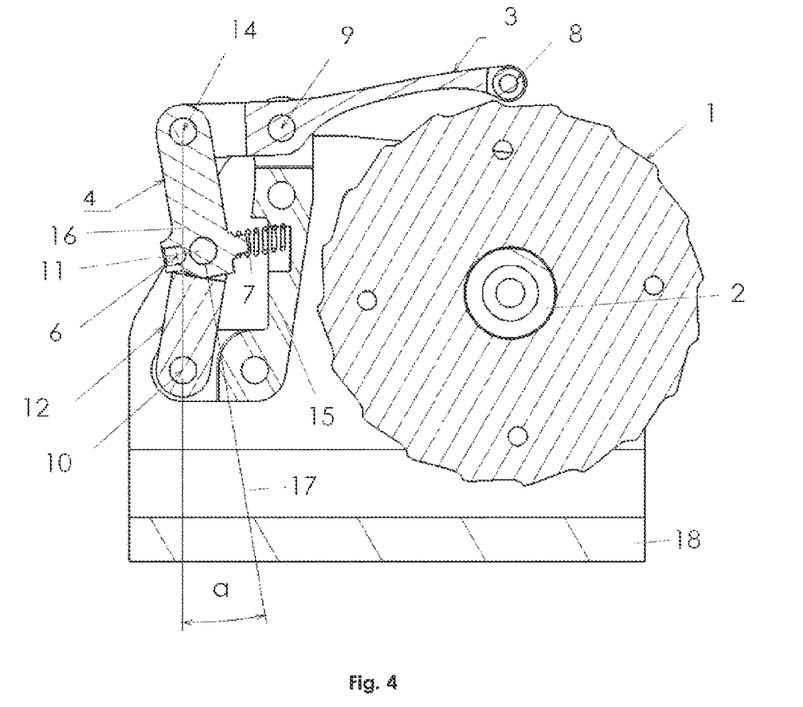
FIG. 4 shows a cross sectional view of third embodiment of the actuator with the brake in a detached position.

FIGS. 3 and 4 show an alternative embodiment of the control mechanism shown in FIGS. 1 and 2. The spring 7 is not fixed directly to the second actuator part, but to a third control lever 15 arranged between the first pivot point 9 and the third pivot point 10. Since the first pivot point 9 and the third pivot point 10 are fixed, the third control lever 15 is also fixed relative to the second actuator part. The electrically powered control element 6 is not directly shown, but only its attachment point 6 to push the fourth pivot point 11 against the spring 7.

In the detached state (of all shown embodiments), the angle between the first virtual line 16 and a third virtual line 17 defined by longitudinal axis of the first control lever 4 and/or defined by the line through the second pivot point 14 and the fourth pivot point 11 have preferably an angle a smaller than 30°, preferably than 25°, preferably than 20°, preferably than 15°, preferably than 12°.

The non-electrically powered control element 7 forces the second mobile pivot point 11 in the attached state, preferably against the stopper 5. Preferably, the electrically powered control element 6, when electrically activated, forces against the force of the non-electrically powered control element 7, the second mobile pivot point 11 out of the first virtual line 16. Due to the perpendicular arrangement of the brake lever 3 to the first and second control levers 4 and 10, there is no force transmitted from the brake element 8 to the control elements 6 or 7. Thus, the force of the control elements 6 and 7 can be small compared to the force of the pushing element or the elastic element.

The embodiment shown in FIG. 2 showed that in some points of the cam 1 (in particular when the element 8' is on the top of the protrusion of the profiles surface of the cam 1), the force created by the lever 3 is so high that the element 6, if reasonable dimensioned for the remaining points on the profiled surface of the cam, cannot bring the rolling element 8' in the detached state. Thus, a stronger control element 6 must be used which is however over dimensioned for most of the other situations. An improved version of FIG. 2 could use a one-way bearing between the mobile element 2 and the cam 1. The one-way bearing allows a movement of the mobile part with respect to the cam 1, when the mobile part 2 moves in the second direction 22, and blocks the relative movements of parts 1 and 2, when the mobile part moves in the first direction 21.

Figure 5:
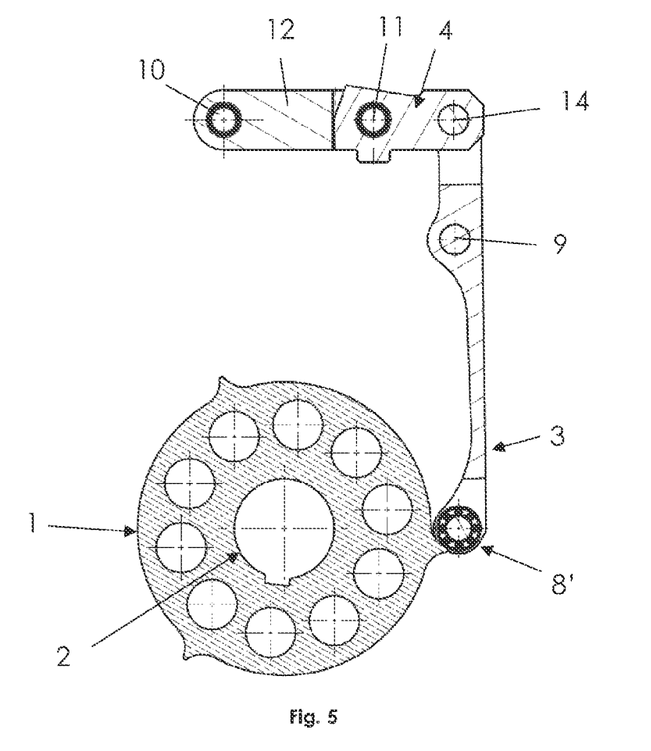
FIG. 5 shows a cross sectional view of a fourth embodiment of an actuator with the brake in an attached position.
Figure 7:
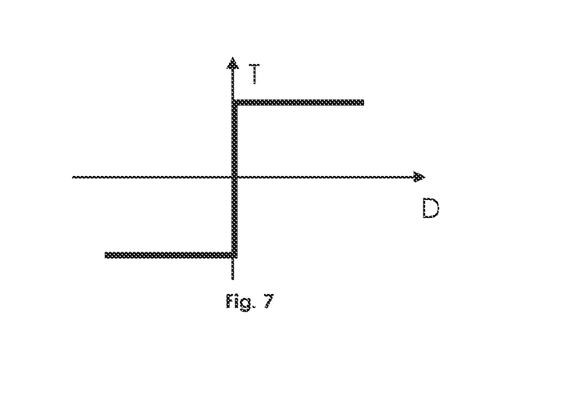
FIG. 7 shows a schematic transfer function of the resistive torque of fourth embodiment over the movement direction.

A fourth embodiment of the brake is shown exemplary in FIG. 5. The embodiment of the brake shown in FIG. 5 has the following behaviour. In case of loss of power, the mechanical brake brakes the mobile element 2 in the first direction 21 and the second direction 22 and allows a movement of the mobile element 2 in the first direction 21, if a force from the aircraft control part on the mobile element 2 exceeds a first threshold force, and allows a movement of the mobile element 2 in the second direction 22, if a force from the aircraft control part on the mobile element 2 exceeds a second threshold force. Thus, if the force on the aircraft control part pushes the mobile element 2 in the first direction 21 or the second direction 22, it is braked as long as the pushing force is smaller than the respective threshold force and once the pushing force exceeds the respective threshold force, the brake allows again a movement of the mobile part 2 in the respective direction. The first and/or second threshold force is defined such to avoid that the force on the aircraft control part could destroy any part of the aircraft control system. The first threshold force is preferably selected equally to the second threshold force so that a symmetric braking function is reached. However, it is also possible to have a different threshold force for the first and second threshold force. FIG. 7 shows schematically the transfer function of the resistive torque T created by the brake over the spin direction D of the mobile part 2 for the fourth embodiment of the brake. Here the mobile part 2 does not move in the first direction 21, if the threshold force is not reached or exceeded, i.e. until a certain resistive torque T of the brake is reached. The mobile part 2 does not move in the second direction 22, if the threshold force is not reached or exceeded, i.e. until a certain resistive torque T of the brake is reached.

The fourth embodiment of the brake can be designed like in one of the first to third embodiment shown in FIG. 1 to 4, in particular like the second embodiment shown in FIG. 2 only with a different design of the cam 1. The same reference signs are used for the same parts and the description of equal function and equal parts of the brake is avoided for the sake of brevity.

The cam 1 comprises a profiled surface. The profiled surface of the cam 1 is adapted/designed to correspond to the brake behaviour described above and shown in FIG. 7. The profiled surface of the cam 1 is designed such that the braking element 8 (pushing against the profiled surface of the cam 1) brakes the movement of the mobile element 2 in the first direction 21 until the force (from the aircraft control part) on the mobile element 2 in the first direction 21 exceeds the first threshold force, in particular when the braking element 8 is in one of the at least one braking position, and such that the braking element 8 (pushing against the profiled surface of the cam 1) brakes the movement of the mobile element 2 in the second direction 22 until the force (from the aircraft control part) on the mobile element 2 in the second direction 21 exceeds the second threshold force, in particular when the braking element 8 is in one of the at least one braking position. The profiled surface of the cam 1 or of the braking position is designed such that the braking element 8 cannot move in a first relative direction until the force on the mobile element 2 in the first direction exceeds the first threshold force and/or that the braking element 8 cannot move in a second relative direction until the force on the mobile element 2 in the second direction exceeds the second threshold force. The first relative direction between the profiled surface of the cam 1 and the braking element 8 causes a movement of the mobile element 2 in the first direction. The second relative direction between the profiled surface of the cam 1 and the braking element 8 causes a movement of the mobile element 2 in the second direction. The first threshold and/or the second threshold is/are preferably chosen such that a force on the aircraft control part in the first control part direction would not damage the system. The first force threshold and/or the second force threshold corresponds thus to the function of the overpressure valve in hydrostatic systems. The profiled surface comprises preferably at least one braking position, preferably at least two, preferably a plurality of braking positions. Each braking position has preferably the same profile. Preferably, the profiled surface of the cam 1 has a circular shape with protrusions at each braking position. The protrusions are preferably symmetrically so that the first force threshold is equal to the second force threshold.

The embodiments with the transfer function shown in FIG. 6 and/or the embodiments described in FIG. 1 to 4 are particularly advantageous for an aircraft being airplanes and/or for an aircraft control part being a flap, a spoiler or an aileron. The embodiments with the transfer function shown in FIG. 7 and/or the embodiment described in FIG. 5 is/are particularly advantageous for an aircraft being a spacecraft or a rocket and/or for an aircraft control part controlling orientation of the spacecraft engine or the rocket engine and/or its nozzle.

It should be understood that the present invention is not limited to the described embodiments and that variations can be applied without going outside of the scope of the appended claims.

The invention claimed is:

1. An actuator for moving an aircraft control part controlling the movement of an aircraft, the actuator comprising:
   a mobile element movable in a first direction and in a second direction;
   an actuating means for moving the mobile element;
   a mechanical brake which, in case of loss of electrical power and/or in case of a brake signal, brakes the mobile element in the first direction;
   wherein the mechanical brake is configured to allow a movement of the mobile element in the first direction, if a force from the aircraft control part on the mobile element exceeds a threshold force, wherein the mechanical brake comprises a cam with a profiled surface and a braking element pushing, in the case of loss of electrical power and/or in case of a brake signal, on the profiled surface of the cam, wherein the profiled surface of the cam is designed such that the braking element pushing against the profiled surface brakes the mobile element in the first direction until the force from the aircraft control part on the mobile element exceeds the threshold force.

2. The actuator according to claim 1, wherein the braking element is configured to roll over the profiled surface of the cam, in particular when the braking element is pushed against the profiled surface of the cam and the mobile element is moving in the first or second direction.

3. The actuator according to claim 1, wherein the braking element is pushed by an elastic element on the profiled surface of the cam.

4. The actuator according to claim 3, wherein the elastic element is a brake lever which is deformable between a support point of the brake lever and the braking element.

5. The actuator according to claim 1, wherein the brake comprises a controller for switching the brake between an attached state in which the braking element pushes against the profiled surface and a detached state in which the braking element does not push against the profiled surface, wherein the controller comprises a non-electrically powered control element which forces the brake in the attached state and an electrically powered control element which, if activated by electrical power, forces the brake in the detached state.

6. The actuator according to the claim 5, wherein the control mechanism comprises further a stopper which stops the control mechanism in the attached state, wherein the non-electrically powered control element forces the second mobile pivot point against the stopper and/or the electrically powered control element, when electrically activated, forces the second mobile pivot point out of the first virtual line against the force of the non-electrically powered control element.

7. The actuator according to claim 1, wherein the brake element is arranged on a brake lever which is supported pivotably around a first pivot point, wherein the brake comprises a control mechanism comprising a first control lever, a second control lever, wherein the first control lever is pivotably connected to the brake lever at a second pivot point, wherein the second pivot point is arranged on the opposite side of the first pivot point of the lever compared to the brake element, wherein the second control lever is pivotably supported around a third pivot point and pivotably connected to the second control lever at a fourth pivot point, wherein, in the attached state, the fourth pivot point is arranged in the first virtual line defined by the third pivot point and the second pivot point, and, in the attached state, the first virtual line is perpendicular to a second virtual line defined by the second pivot point and the first pivot point and, in the detached state, the fourth pivot point is moved out of the first virtual line.

8. The actuator according to claim 1, wherein the cam is arranged on the mobile element and the braking element is arranged on a fixed element of the actuator.

9. The actuator according to claim 1, wherein the mobile element is a rotating element pivotable around a rotation axis, wherein the first direction is a first rotation direction around the rotation axis, wherein the second direction is a second rotation direction around the rotation axis, wherein the force from the aircraft control part on the mobile element is a torque and the threshold force is a threshold torque.

10. The actuator according to claim 1, wherein the mechanical brake, in case of loss of electrical power and/or in case of a brake signal, allows a movement in the second direction.

11. The actuator according to claim 1, wherein the mechanical brake, in case of loss of electrical power and/or in case of a brake signal, allows a movement in the second direction wherein the profiled surface of the cam is designed such that the braking element pushing against the profiled surface allows a movement of the mobile element in the second direction.

12. The actuator according to claim 1, wherein the mechanical brake, in case of loss of electrical power and/or in case of a brake signal, allows a movement in the second direction, wherein the brake, in particular the cam is coupled over a one-way bearing with the mobile element allowing a free movement of the mobile element in the second direction and couples the mobile element with the brake, in particular the cam to brake the mobile element in the first direction.

13. The actuator according to claim 1, wherein the mechanical brake, in case of loss of electrical power and/or in case of a brake signal, brakes the mobile element in the second direction and allows a movement of the mobile element in the second direction, if a force from the aircraft control part on the mobile element exceeds a second threshold force.

14. The actuator according to claim 1, wherein the actuating means is an electro-mechanical actuator.

15. The actuator according to claim 1, wherein the aircraft control part is a flap, spoiler or aileron of an airplane.

16. An aircraft control system comprising:
    an aircraft control part being movable for controlling the movement of the aircraft, wherein the aircraft control part can be moved between an initial or retracted position to one or several control positions;
    an actuator according to claim 1 for controlling the movement of the aircraft control part, wherein the mobile element of the actuator moving into the first direction moves the aircraft control part from a control position into the initial or retracted position.

17. The aircraft control system according to claim 16, wherein the aircraft control system is for an airplane and the aircraft control part is a flap, a spoiler or an aileron.

18. An aircraft with the aircraft control system according to claim 16.

19. An actuator for moving an aircraft control part controlling the movement of an aircraft, the actuator comprising:
- a mobile element movable in a first direction and in a second direction;
- an actuating means for moving the mobile element;
- a mechanical brake which, in case of loss of electrical power and/or in case of a brake signal, brakes the mobile element in the first direction;
- wherein the mechanical brake is configured to allow a movement of the mobile element in the first direction, if a force from the aircraft control part on the mobile element exceeds a threshold force, wherein the mobile element is a rotating element pivotable around a rotation axis, wherein the first direction is a first rotation direction around the rotation axis, wherein the second direction is a second rotation direction around the rotation axis, wherein the force from the aircraft control part on the mobile element is a torque and the threshold force is a threshold torque, wherein the actuator comprises a converter element transforming the rotational movement of the rotating element into a translational movement for controlling the aircraft control part.

* * * * *